US012591794B2

(12) United States Patent
Ong et al.

(10) Patent No.: US 12,591,794 B2
(45) Date of Patent: Mar. 31, 2026

(54) JOINT PREDICTION AND IMPROVEMENT FOR MACHINE LEARNING MODELS

(71) Applicant: International Business Machines Corporation, Armonk, NY (US)

(72) Inventors: Yuya Jeremy Ong, San Jose, CA (US); Aly Megahed, San Jose, CA (US); Mark S. Squillante, Greenwich, CT (US); Yingdong Lu, Yorktown Heights, NY (US); Yitao Liang, Sherman Oaks, CA (US); Pravar Mahajan, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 17/956,065

(22) Filed: Sep. 29, 2022

(65) Prior Publication Data

US 2024/0127084 A1      Apr. 18, 2024

(51) Int. Cl.
G06N 5/04              (2023.01)
(52) U.S. Cl.
CPC ..................................... G06N 5/04 (2013.01)
(58) Field of Classification Search
CPC ...................................................... G06N 5/04
See application file for complete search history.

(56) References Cited

U.S. PATENT DOCUMENTS

| | | | | |
|---|---|---|---|---|
| 6,253,169 B1 * | 6/2001 | Apte | ..................... | G06F 16/355 |
| | | | | 715/236 |
| 6,388,592 B1 * | 5/2002 | Natarajan | ............... | H03M 7/30 |
| | | | | 706/45 |
| 2013/0144815 A1 * | 6/2013 | Luo | ........................ | G06F 16/901 |
| | | | | 706/12 |
| 2013/0144818 A1 * | 6/2013 | Jebara | .................... | G06Q 50/00 |
| | | | | 706/12 |

(Continued)

FOREIGN PATENT DOCUMENTS

WO      WO-2021105313 A1 *  6/2021   ............... G06N 7/01

OTHER PUBLICATIONS

A Survey of Cost-Sensitive Decision Tree Induction Algorithms, 2013 (Year: 2013).*

(Continued)

*Primary Examiner* — Christopher E Dunay
(74) *Attorney, Agent, or Firm* — Ryan, Mason & Lewis, LLP

(57)          ABSTRACT

Methods, systems, and computer program products for a joint prediction and improvement framework for machine learning models are provided herein. A method includes obtaining a machine learning model initialized with a set of parameters; identifying one or more actions based on test inputs corresponding to the machine learning model and historical actions related to a task, where the historical actions are dependent on respective historical outputs of the machine learning model; using the identified one or more actions to jointly compute: one or more first values corre- (Continued)

sponding to inference loss for the machine learning model; and one or more second values based at least in part on a computing cost function associated with the task; and updating the set of parameters of the machine learning model based on the one or more first values and the one or more second values.

20 Claims, 5 Drawing Sheets

(56)                References Cited

U.S. PATENT DOCUMENTS

| | | | | |
|---|---|---|---|---|
| 2015/0032680 | A1* | 1/2015 | Cichosz | G06N 5/04 |
| | | | | 706/50 |
| 2015/0206055 | A1* | 7/2015 | Sengupta | G06N 5/04 |
| | | | | 706/46 |
| 2015/0302317 | A1* | 10/2015 | Norouzi | G06N 20/00 |
| | | | | 706/12 |
| 2020/0364552 | A1* | 11/2020 | Guo | H03M 7/24 |
| 2021/0158145 | A1* | 5/2021 | Lin | G06N 3/047 |
| 2021/0248459 | A1* | 8/2021 | Li | G06N 3/08 |
| 2022/0405570 | A1* | 12/2022 | Vadera | G06N 7/01 |

OTHER PUBLICATIONS

P. L. Donti et al., "Task-based End-to-End Model Learning in Stochastic Optimization," Advances in Neural Information Processing Systems, arXiv:1703.04529v4, Apr. 25, 2019, 15 pages.

A. N. Elmachtoub et al., "Smart 'Predict, then Optimize'," arXiv:1710.08005v5, Nov. 19, 2020, 46 pages.

D. Bertsimas et al., "From Predictive to Prescriptive Analytics," arXiv:1402.5481v4, Jul. 19, 2018, 60 pages.

N. Ho-Nguyen et al., "Risk Guarantees for End-to-End Prediction and Optimization Processes," arXiv:2012.15046v1, Dec. 30, 2020, 50 pages.

A. N. Elmachtoub et al., "Decision Trees for Decision-Making under the Predict-then-Optimize Framework," International Conference on Machine Learning, Proceedings of Machine Learning Research, Jul. 2020, 10 pages, vol. 119.

K. Zhou et al., "DHA: End-to-End Joint Optimization of Data Augmentation Policy, Hyper-parameter and Architecture," arXiv:2109.05765v1, Sep. 13, 2021, 11 pages.

Q. Zhang et al., "Joint Descent: Training and Tuning Simultaneously," The International Conference on Learning Representations, Sep. 28, 2020, 11 pages.

A. Sekhon et al., "Relate and Predict: Structure-Aware Prediction with Jointly Optimized Neural DAG," arXiv:2103.02405v1, Mar. 3, 2021, 14 pages.

* cited by examiner

*FIG. 5*

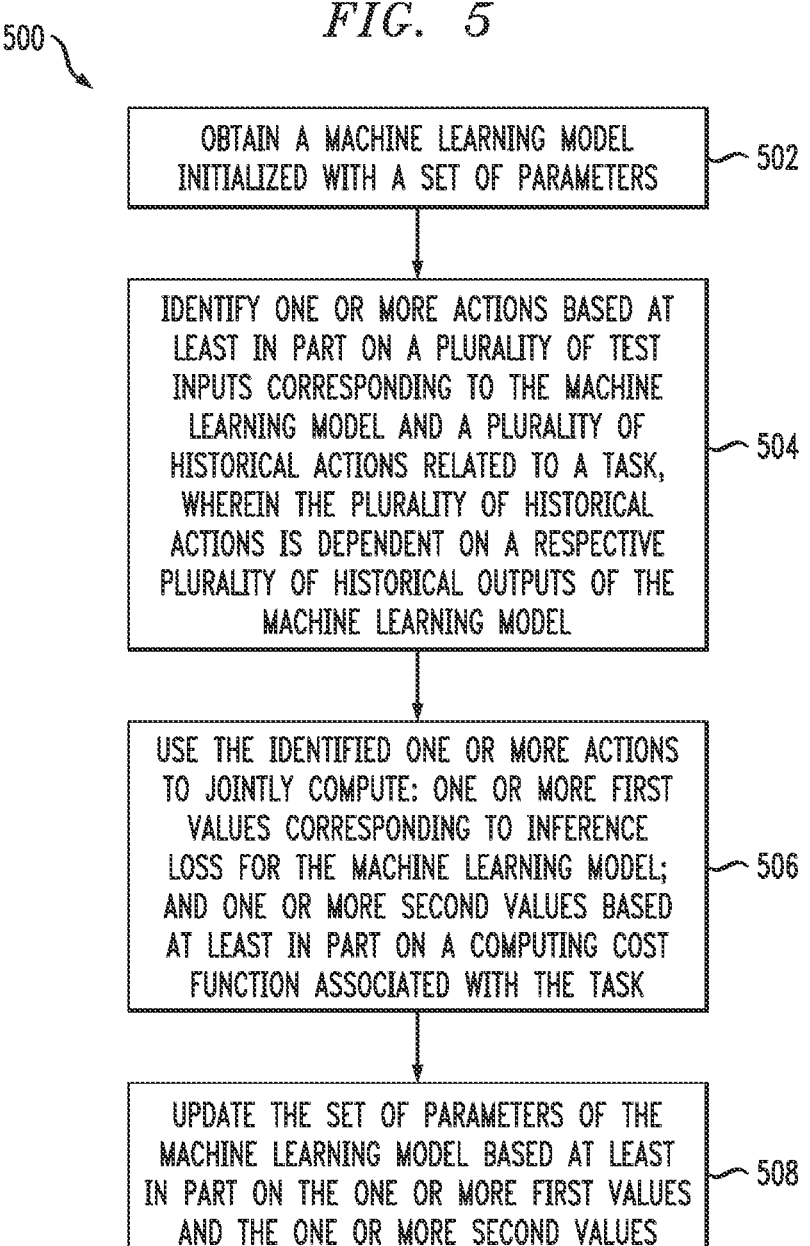

500

OBTAIN A MACHINE LEARNING MODEL INITIALIZED WITH A SET OF PARAMETERS — 502

IDENTIFY ONE OR MORE ACTIONS BASED AT LEAST IN PART ON A PLURALITY OF TEST INPUTS CORRESPONDING TO THE MACHINE LEARNING MODEL AND A PLURALITY OF HISTORICAL ACTIONS RELATED TO A TASK, WHEREIN THE PLURALITY OF HISTORICAL ACTIONS IS DEPENDENT ON A RESPECTIVE PLURALITY OF HISTORICAL OUTPUTS OF THE MACHINE LEARNING MODEL — 504

USE THE IDENTIFIED ONE OR MORE ACTIONS TO JOINTLY COMPUTE: ONE OR MORE FIRST VALUES CORRESPONDING TO INFERENCE LOSS FOR THE MACHINE LEARNING MODEL; AND ONE OR MORE SECOND VALUES BASED AT LEAST IN PART ON A COMPUTING COST FUNCTION ASSOCIATED WITH THE TASK — 506

UPDATE THE SET OF PARAMETERS OF THE MACHINE LEARNING MODEL BASED AT LEAST IN PART ON THE ONE OR MORE FIRST VALUES AND THE ONE OR MORE SECOND VALUES — 508

JOINT PREDICTION AND IMPROVEMENT FOR MACHINE LEARNING MODELS

BACKGROUND

The present disclosure generally relates to information technology, and more specifically, to techniques for improving machine learning (ML) models. Typically, ML models are built based on historical data to make predictions. The predictions are often relied on within the context of larger systems.

SUMMARY

Embodiments of the present disclosure provide machine learning techniques for a joint prediction and improvement framework.

In one illustrative embodiment, a system includes a memory configured to store program instructions, and a processor operatively coupled to the memory to execute the program instructions to obtain a machine learning model initialized with a set of parameters. One or more actions are identified based at least in part on a plurality of test inputs corresponding to the machine learning model and a plurality of historical actions related to a task, where the plurality of historical actions is dependent on a respective plurality of historical outputs of the machine learning model. The identified one or more actions are used to jointly compute: one or more first values corresponding to inference loss for the machine learning model; and one or more second values based at least in part on a computing cost function associated with the task. The set of parameters of the machine learning model are updated based at least in part on the one or more first values and the one or more second values.

In another illustrative embodiment, a computer program product includes a computer readable storage medium having program instructions embodied therewith. The program instructions are executable by a computing device to cause the computing device to obtain a machine learning model initialized with a set of parameters. One or more actions are identified based at least in part on a plurality of test inputs corresponding to the machine learning model and a plurality of historical actions related to a task, where the plurality of historical actions is dependent on a respective plurality of historical outputs of the machine learning model. The identified one or more actions are used to jointly compute: one or more first values corresponding to inference loss for the machine learning model; and one or more second values based at least in part on a computing cost function associated with the task. The set of parameters of the machine learning model are updated based at least in part on the one or more first values and the one or more second values.

In another illustrative embodiment, a computer-implemented method includes obtaining a machine learning model initialized with a set of parameters. The method includes identifying one or more actions based at least in part on a plurality of test inputs corresponding to the machine learning model and a plurality of historical actions related to a task, where the plurality of historical actions is dependent on a respective plurality of historical outputs of the machine learning model. The method also includes using the identified one or more actions to jointly compute: one or more first values corresponding to inference loss for the machine learning model; and one or more second values based at least in part on a computing cost function associated with the task. The method includes updating the set of parameters of the machine learning model based at least in part on the one or more first values and the one or more second values.

These and other objects, features and advantages of the present disclosure will become apparent from the following detailed description of illustrative embodiments thereof, which is to be read in connection with the accompanying drawings.

BRIEF DESCRIPTION OF THE DRAWINGS

FIG. 5 is a flow diagram of a process for a joint prediction and improvement framework in accordance with exemplary embodiments.

DETAILED DESCRIPTION

Figure 1:
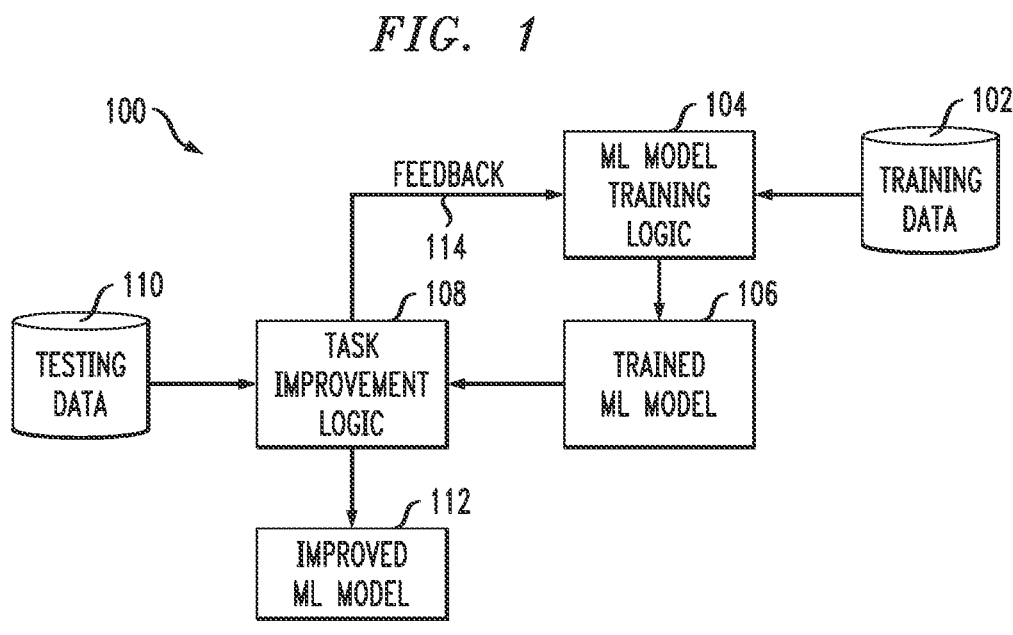
FIG. 1 is an example of an architecture of a framework in accordance with illustrative embodiments.

ML algorithms typically include building a predictive model for a given task (e.g., classification, regression, clustering), and applying an improvement process until some threshold accuracy for the task is achieved. Conventionally, the prediction and improvement processes are performed independently. For example, a predictive model is built, and outputs of the predictive model are then used by the improvement process to generate decision values based on the prediction. An example of an improvement process can include an optimization process.

By way of example, consider a predictive model having the following notation: $F(X)=Pr(Y|X;\theta)=Y$, where X is the model input, Y is the predicted output, and $\theta$ is the predictive model parameters of the predictive model. Also assume that the ML model is used in a larger task improvement process for some defined action, where the process makes decisions Z (e.g., to take an action) based on a prediction ($\hat{Y}$) of the predictive model, and further incurs some cost (e.g., computation cost) as defined by, $G(Y, Z)$. In such an example, the goal is to learn the appropriate predictive model such that the process can make a decision that incurs the smallest cost. This can be expressed more formally as:

$$Z^*(X;\theta) = \arg\min_{z} \mathbb{E}_{y\sim Pr(Y|X)}[G(Y, Z)]$$

Conventional approaches often focus on the predictions alone, and the improvement process identifies a particular task action (e.g., the optimal task action). This assumes that accurate predictions lead to the improved task actions. In other words, the prediction process and the improvement process are treated separately and are performed sequentially. Additionally, the prediction process and the improvement process frequently involve different subject matter experts (e.g., statisticians and operations research professionals, respectively). Such approaches often do not provide improvements, even when manually switching back and forth between prediction and improvement processes.

As discussed in greater detail below, embodiments of the present disclosure generally relate to systems and computerized methods for providing a joint prediction and improvement framework for ML models. Some embodiments described herein can incorporate actions that are affected by the output of an ML model as inputs when training the ML model. Accordingly, actions selected by a downstream decision-making process based on the output from an ML model can be significantly improved relative to conventional approaches (e.g., with respect to accuracy and/or relevancy) when the ML model is jointly trained in this manner. Additionally, conventional approaches that treat the prediction process and the improvement process separately and sequentially often need to perform additional training or retraining of the ML model (possibly requiring additional training data) when the results are not satisfactory. In at least some embodiments, the joint prediction and improvement framework can avoid such issues by jointly performing the prediction process and the improvement process, thereby improving the efficiency of the training (for example, in terms of time and/or hardware resources, such as processing, memory, and/or storage resources).

Referring now to FIG. 1, this figure shows an example of an architecture 100 of a joint prediction and improvement framework in accordance with illustrative embodiments. Generally, FIG. 1 includes ML model training logic 104 that generates a trained ML model 106 based on training data 102. The framework shown in FIG. 1 also includes task improvement logic 108, which obtains the trained ML model 106 and testing data 110. In some embodiments, the testing data is assumed to include one or more training samples that are not present in the training data 102. The task improvement logic 108 generates feedback 114 for the ML model training logic 104 based on the testing data 110 and the trained ML model 106. The ML model training logic 104 continues the training process until the ML model meets one or more termination criteria. When the termination criteria are satisfied, the trained ML model is output as improved ML model 112. Additional description of the features of FIG. 1 are described in further detail elsewhere herein.

Figure 2:
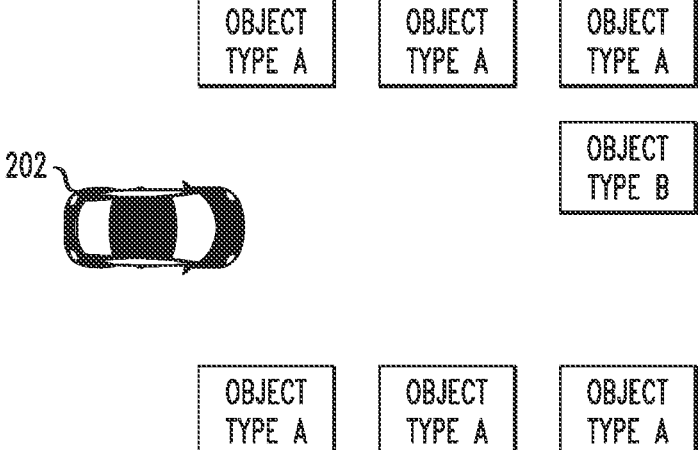
FIG. 2 shows an example of an ML task in accordance with an illustrative embodiment.

For example, FIG. 2 shows an example of an ML task in accordance with an illustrative embodiment. More specifically, FIG. 2 shows an example of a self-driving car 202. It is assumed that a predictive model is implemented by the self-driving car 202 to classify objects, and a task improvement model is implemented by the by the self-driving car 202 as a driving module. The FIG. 2 examples includes type A objects and type B objects, and the predictive model can classify these objects. The driving module can cause the self-driving car 202 to take one or more actions (e.g., braking, accelerating, steering, etc.) based on the type of objects identified by the predictive model. Conventional approaches generally assume bias towards higher accuracy. So, if the predictive model predicted all of the type A objects with high accuracy relative to the type B object, then these would be given more weight than the type B object in the action taken by the self-driving module, even if the type B object is more important to determining the action to be taken. One or more embodiments described herein enable the self-driving car 202 to consider the action to be taken with respect to the set of input data. For example, the action of the driving module can give more weight to the type B object in determining which action to take, even if it the type B object is predicted with lower accuracy than the type A objects.

Figure 3A:
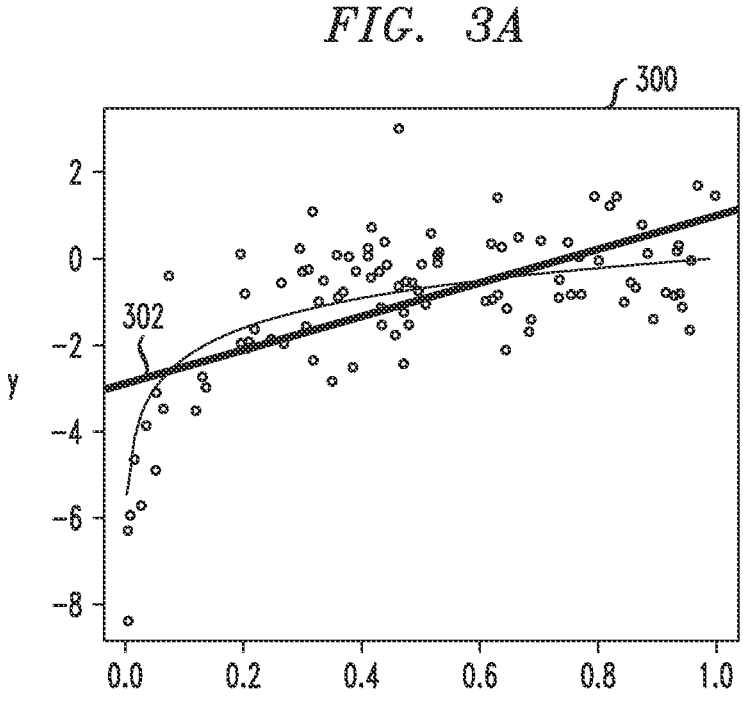
FIGS. 3A and 3B show examples of ML improvement techniques in accordance with illustrative embodiments.
Figure 3B:
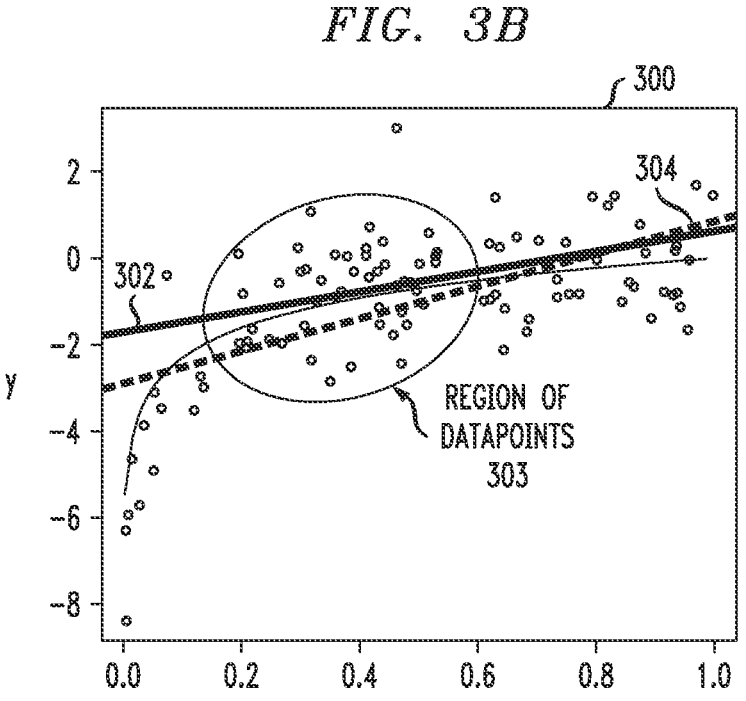

FIGS. 3A and 3B show examples of linear models in accordance with illustrative embodiments. Specifically, FIG. 3A shows a linear model 302 that is trained on a set of data points shown in plot 300. In this example, the linear model 302 is assumed to be substantially optimized against predictive model loss without consideration for any downstream tasks. In some situations, it may be advantageous to give more weight to a particular region of data points, such as the region of data points 303 shown in FIG. 3B. One or more embodiments described herein can generate a linear model 304 to improve against task computational cost, thereby factoring in the region of data points 303 into the linear model 304.

A process for training an ML model that jointly considers both an ML predictive loss function and a task-defined objective function (or cost function) in accordance with some embodiments is now described. The process is described with reference to the following inputs and outputs:

---

Inputs:

Training Dataset: $\mathcal{D}_{train} = \{(x_1, y_1, z_1), \dots, (x_n, y_n, z_n)\}$, where n is the number of samples, X is a set of input features such that $x \in X$, Y is a set of output features such that $y \in Y$, and Z is a set of action values such that $z \in Z$ Testing Dataset: $\mathcal{D}_{test} = \{x_1, \dots, x_m\}$
    Task-Defined Objective Function: $g(z, y)$
    Possible Action Value Ranges: $\bar{Z}$ Outputs:
    Action(s): $Z^*$
    Improved Task-Defined Objective Function: $g^*(Z^*, Y)$
    Improved Learned Model Parameter: $\theta^*$

---

In some examples, it is assumed that the ML model, $y \sim Pr(y|x, z;\theta)$, is differentiable and that the joint weighted objective function is differentiable with respect to the inputs. Also, the task-defined objective function can be a linear function with respect to input, x, and an action value, z, where the function is differentiable as long as x and z are continuous. It may also be assumed that the task improvement constraints are linear with respect to x and z.

According to at least one embodiment, a stochastic gradient descent process can be used to improve task-defined objective function. For example, given $X_{test}$, a prediction is generated by the ML model to produce $\hat{y}_{test}$, which is used to find an action, $z^*$, that reduces (e.g., minimizes) the task-defined objective function, $g(z,y)$, as shown in the following equation:

$$\arg\min_{z} \mathbb{E}_{y \sim Pr(y|x,z;\theta)}[g(z, y)]$$

To train a model that jointly considers both the ML predictive loss function and the task-constrained objective function, a joint weighted cost function can be defined as follows:

$$F(y_{train}, \hat{y}_{train}, y_{test}, \hat{z}, z^*_{train}, z^*_{test}) =$$

$$l\left(y_{j_{train}}, \hat{y}_{j_{train}}\right) \cdot \omega(\hat{z}, z^*_{train}, \alpha) + g\left(\hat{z}_k, y_{j_{test}}\right) \cdot \gamma(z^*_{test}, z^*_{train}, \beta),$$

where: $l(y_{j_{train}}, \hat{y}_{j_{train}})$ is the predictive loss function, $\omega(\hat{z}, z^*_{train}, \alpha)$ is the weight for the predictive loss function; and $\gamma(z_t^*, z^*_{train}, \beta)$ is a weight function defined for the task-defined objective function. $\omega(\hat{z}, z^*_{train}, \alpha)$ is an increasing function with respect to the distance between $\hat{z}$ and $z^*_{train}$, and $\gamma(z_t^*, z_{train}^*, \beta)$ is a decreasing function with respect to the distance between $z_{test}^*$ and $z_{train}^*$. Accordingly, the cost function can be used as an objective to improve over both the predictive loss and the task-constrained objective function.

In some embodiments, the weighted joint loss and task improvement function is formulated to minimize g(z,y) to find the improved z*, given some y from the testing distribution. Since y is not provided, some embodiments estimate y as ŷ=f(x), which is trained on the training distribution. In at least one embodiment, the following loss function is used to perform joint training and improvement:

$$\min_{x_{train}, x_{test}} [g(z_{test}^*, y_{test}) + l(y_{train}, \hat{y}_{train})],$$

which can be rewritten as:

$$\min_{x_{train}, x_{test}} [g(z_{test}^*, f(x_{test})) + l(y_{train}, f(x_{train}))].$$

The action taken can be considered as part of the modeling process by adding the actions as part of the input into the model, as shown below:

$$\min_{x_{train}, x_{test}} [g(z_{test}^*, f(x_{test}, z_{test}^*)) + l(y_{train}, f(x_{train}, z_{train}))]$$

In one embodiment, the following weighted cost loss function is applied to appropriately weight the predictive model with respect to the testing distribution:

$$\min_{x_{train}, x_{test}} [g(z_{test}^*, f(x_{test}, z_{test}^*)) +$$
$$\omega(\alpha, x_{train}, x_{test}, z_{train}, z_{test}^*) * l(y_{train}, f(x_{train}, z_{train}))]$$

Additionally, a weight parameter, $\beta$, is introduced for the task-defined objective function, as shown below:

$$\min_{x_{train}, x_{test}} [\beta * g(z_{test}^*, f(x_{test}, z_{test}^*)) +$$
$$\omega(\alpha, x_{train}, x_{test}, z_{train}, z_{test}) * l(y_{train}, f(x_{train}, z_{train}))]$$

The joint prediction and improvement framework, in at least some embodiments, can be implemented based at least in part on the following algorithm:

1. Obtain inputs comprising: outputs labels from historical data ($Y_{train}$): historical actions taken based on the output from the historical data labels ($Z_{train}$); testing data corresponding to unseen observations for the predictive model inputs ($X_{test}$); a range of possible actions ($Z_{range}$); an initialized predictive model (F(X, Z)=Pr (Y|X, Z; $\theta$)), which considers both input features as well as task improvement values; and a task-defined constrained cost function (G(Y, Z)), given the predictive model output and a given task action.
2. Given F(X, Z) and $X_{test}$, determine a set of action probabilities for $Z_{range}$.
3. Jointly compute inference loss weights and task improvement cost values based on the set of action probabilities for $Z_{range}$ and the historical label values, $Y_{train}$.

4. Use the computed inference loss weights and task improvement cost values from step 3 to compute gradients and perform stochastic gradient descent (STD) to update the model weights with respect to the predictive model parameters.
5. Repeat steps 2-4 until one or more termination criteria are satisfied.
6. Output: task actions, Z*; improved task-defined constrained cost function, G*, derived from the task actions, Z*; and improved predictive model parameters, $\theta$*.

Figure 4:
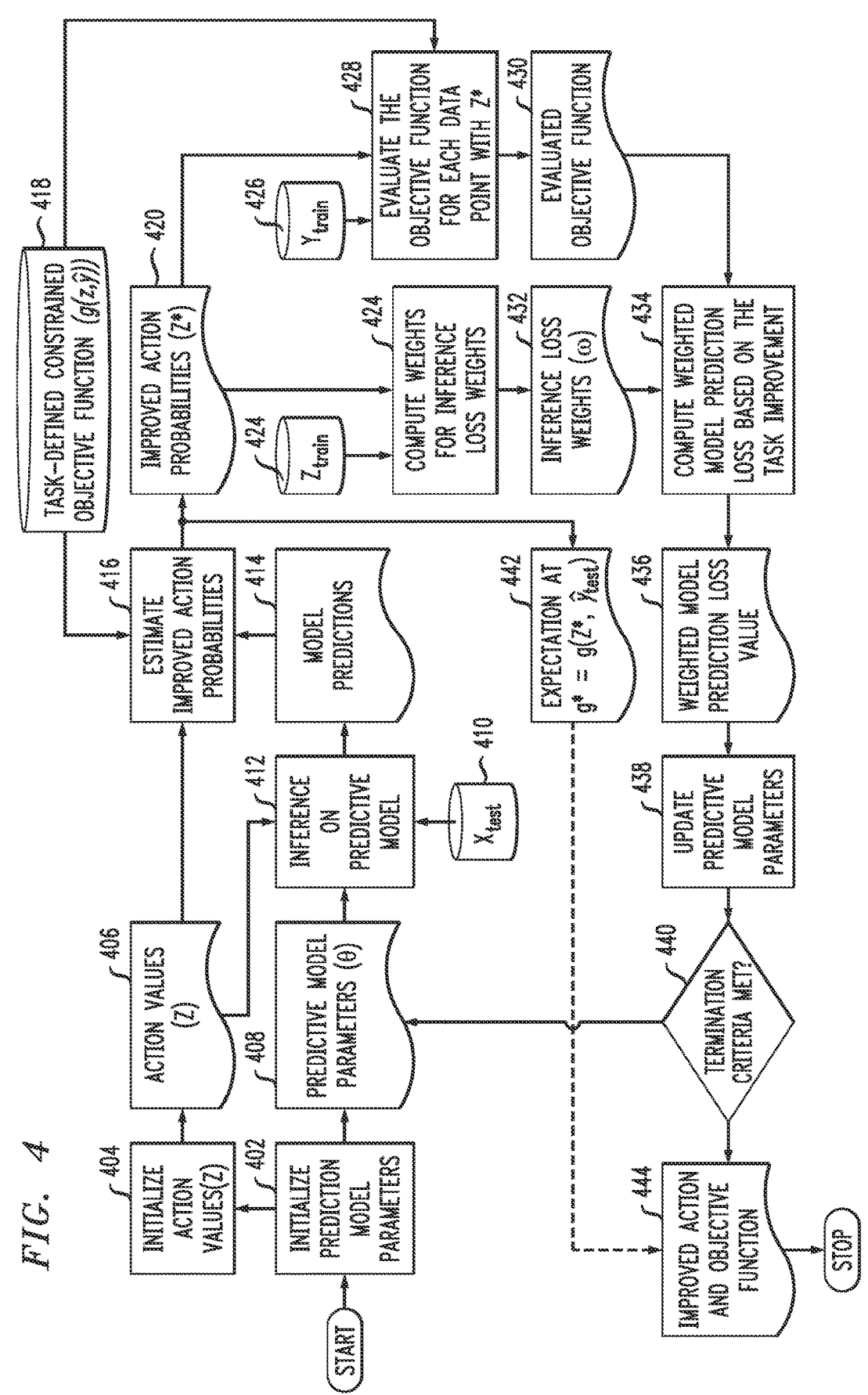
FIG. 4 is a process flow diagram for an ML prediction and improvement framework in accordance with an illustrative embodiment.

FIG. 4 shows a flow diagram for an ML prediction and improvement framework in accordance with an illustrative embodiment. It is noted that the flow diagram in FIG. 4 represents processes as rectangles, and inputs and outputs are shown with light shading.

The flow diagram starts at process 402, which includes initializing and outputting predictive model parameters ($\theta$) 408.

Process 404 includes initializing and outputting one or more action values (Z) 406. For example, the action values can be predefined and/or specified by a user. The actions values may include discrete quantities and/or continuous quantities, for example.

Process 412 includes inferencing on a predictive model based on the predictive model parameters 408, action values 406 (Z), and test inputs obtained from a dataset 410 of testing data, $X_{test}$, thereby generating one or more model predictions ($\hat{y}$) 414.

Process 416 obtains the action values 406 (Z), the model predictions 414, and a task-defined constrained objective function (g(z,ST)) 418 as inputs, and estimates and outputs improved action probabilities (Z*) 420. Process 416 also outputs an expectation at g*=g(Z*, STtest), as shown at output 442. The expectation can be computed as the average value of the objective function over all $\hat{y}_{test}$ samples, and can be used to evaluate the performance of the model, for example.

Process 424 obtains the improved action probabilities (Z*) 420 as well as one or more historical actions from a dataset 422 of historical actions, $Z_{train}$, and generates one or more inference loss weights ($\omega$) 432. The historical actions from the dataset 422 are taken based on corresponding output labels from a dataset 426 of output labels, $Y_{train}$, associated with historical data.

Process 428 obtains the output labels from the dataset 426, the task-defined constrained objective function 418, and the improved action probabilities (Z*) 420. Process 428 evaluates the objective function for each data point with Z* and outputs the evaluated objective function 430. In some embodiments, the objective function can be computed based on an equation defined by user that takes into account the action probabilities and the historical training data, $Y_{train}$, for example Process 434 obtains the one or more inference loss weights (w) 432 and the evaluated objective function 430, and computes weighted model prediction loss based on the task improvement. The weighted model prediction loss value 436 is output to process 438.

Process 438 includes updating the predictive model parameters. A test 440 is performed to determine whether the updated predictive model parameters satisfy one or more termination criteria. If no, then the predictive model parameters ($\theta$) 408 are replaced with the updated predictive model parameters from process 438, and processes 412, 416, 424, 428, 434, and 438 are repeated until the termination criteria are met. For example, the termination criteria may include a specified number of iterations or epochs. In some embodiments, the termination criteria can include evaluating whether a difference between the previous joint cost function and the current cost function is less than a specified difference parameter (e.g., selected by a user). If yes, then the improved action and objective function 444 (and optionally, the expectation at $g^*=g(Z^*, \hat{y}_{test})$) are output and the process flow stops.

FIG. 5 is a flow diagram of a process 500 for a joint prediction and improvement framework in accordance with exemplary embodiments.

Step 502 includes obtaining a machine learning model initialized with a set of parameters. Step 504 includes identifying one or more actions based at least in part on a plurality of test inputs corresponding to the machine learning model and a plurality of historical actions related to a task, wherein the plurality of historical actions is dependent on a respective plurality of historical outputs of the machine learning model. Step 506 includes using the identified one or more actions to jointly compute: one or more first values corresponding to inference loss for the machine learning model; and one or more second values based at least in part on a computing cost function associated with the task. Step 508 includes updating the set of parameters of the machine learning model based at least in part on the one or more first values and the one or more second values.

The process 500 may further include determining whether the updated set of parameters of the machine learning model satisfies one or more performance criteria; and in response to the updated set of parameters of the machine learning model not satisfying the one or more performance criteria, performing the identifying, the using, and the updating with the updated set of parameters of the machine learning model.

The process 500 may further include providing the updated set of parameters of the machine learning model to one or more computing devices.

Computing the one or more first values corresponding to inference loss for the machine learning model may be based at least in part on a comparison of between the plurality of historical outputs and outputs of the machine learning model corresponding to the plurality of test inputs.

Computing the one or more second values may include: computing one or more distance values between a given one of the identified one or more actions and one or more of the plurality of historical actions; and identifying one or more of the plurality of historical outputs relevant to the given one of the identified one or more actions based at least in part on the computed distance values. Each of the distance values may be computed based on at least one of: an absolute difference between the given one of the identified one or more actions and a given one of the one or more of the plurality of historical actions; and a distance function for the given one of the identified one or more actions and one or more probability distributions determined for the one or more of the plurality of historical actions. Updating the set of parameters of the machine learning model may include performing a stochastic gradient descent process on gradients that are computed based at least in part on the one or more first values and the more or more second values.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as joint prediction and improvement framework code 626 (also referred to as "block 626"). In addition to block 626, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 626, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Figure 6:
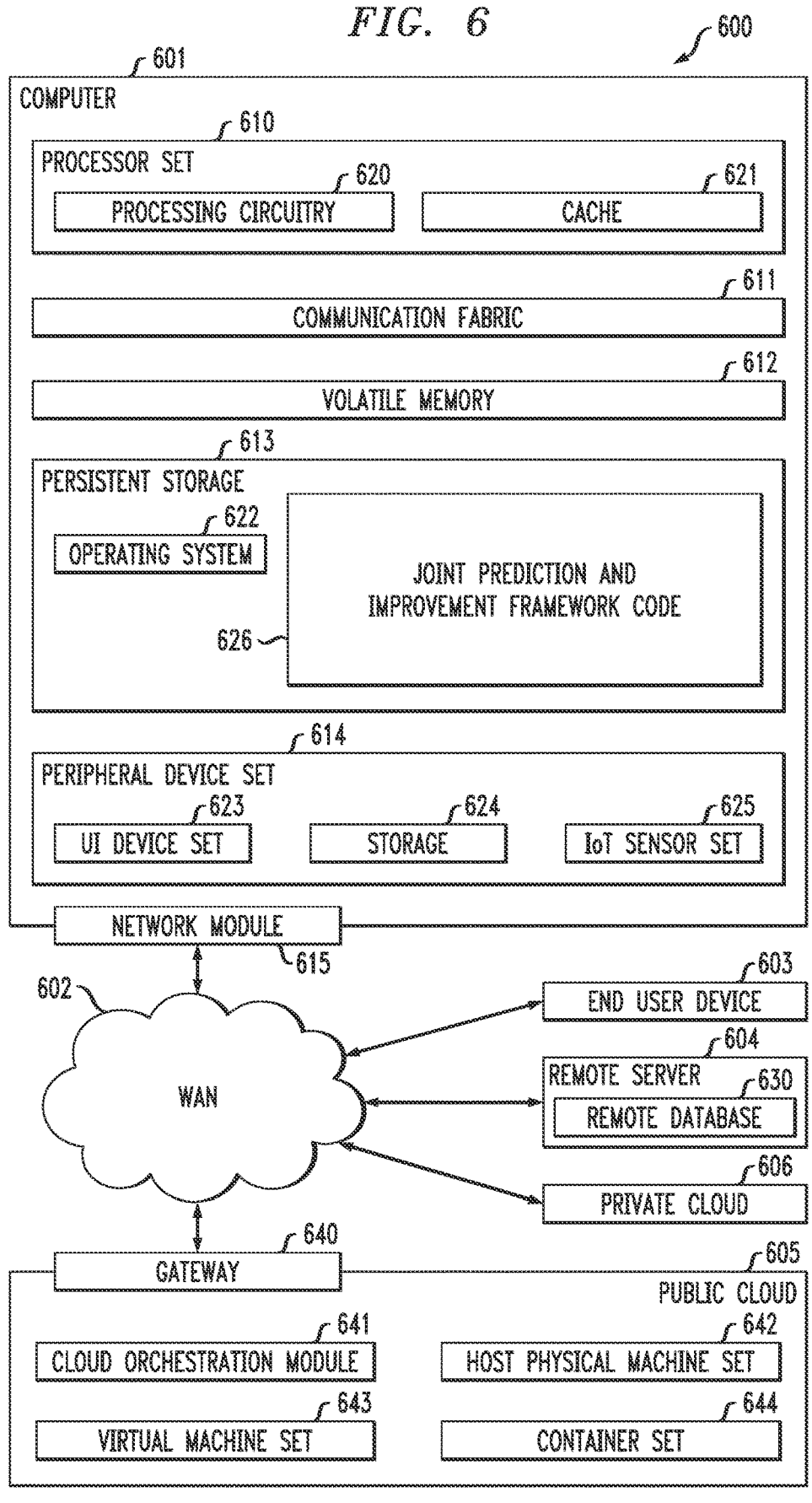
FIG. 6 is a diagram illustrating a computing environment in which at least one embodiment of the invention can be implemented.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/ or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 626 in persistent storage 613.

Communication fabric 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 626 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory configured to store program instructions;
a processor operatively coupled to the memory to execute the program instructions to:
obtain a machine learning model initialized with a set of parameters;
identify one or more actions based at least in part on a plurality of test inputs corresponding to the machine learning model and a plurality of historical actions related to a downstream task, wherein the plurality of historical actions is dependent on a respective plurality of historical outputs of the machine learning model;
use the identified one or more actions to jointly compute: one or more first values corresponding to inference loss for the machine learning model that is adjusted based on the identified one or more actions; and one or more second values based at least in part on a computing cost function associated with the downstream task; and update the set of parameters of the machine learning model based at least in part on the one or more first values and the one or more second values.

2. The system of claim 1, wherein the processor is operatively coupled to the memory to execute the program instructions to:

determine whether the updated set of parameters of the machine learning model satisfies one or more performance criteria; and in response to the updated set of parameters of the machine learning model not satisfying the one or more performance criteria, perform the identifying, the using, and the updating with the updated set of parameters of the machine learning model.

3. The system of claim 2, wherein the processor is operatively coupled to the memory to execute the program instructions to:

provide the updated set of parameters of the machine learning model to one or more computing devices.

4. The system of claim 1, wherein computing the one or more first values corresponding to inference loss for the machine learning model is based at least in part on a comparison between the plurality of historical outputs and outputs of the machine learning model corresponding to the plurality of test inputs.

5. The system of claim 1, wherein computing the one or more second values comprises:

computing one or more distance values between a given one of the identified one or more actions and one or more of the plurality of historical actions; and identifying one or more of the plurality of historical outputs relevant to the given one of the identified one or more actions based at least in part on the computed distance values.

6. The system of claim 5, wherein each of the distance values is computed based on at least one of:

an absolute difference between the given one of the identified one or more actions and a given one of the one or more of the plurality of historical actions; and a distance function for the given one of the identified one or more actions and one or more probability distributions determined for the one or more of the plurality of historical actions.

7. The system of claim 1, wherein updating the set of parameters of the machine learning model comprises:

performing a stochastic gradient descent process on gradients that are computed based at least in part on the one or more first values and the one or more second values.

8. A computer program product comprising a non-transitory computer readable storage medium having program instructions embodied therewith, the program instructions executable by a computing device to cause the computing device to:

obtain a machine learning model initialized with a set of parameters;

identify one or more actions based at least in part on a plurality of test inputs corresponding to the machine learning model and a plurality of historical actions related to a downstream task, wherein the plurality of historical actions is dependent on a respective plurality of historical outputs of the machine learning model;

use the identified one or more actions to jointly compute: one or more first values corresponding to inference loss for the machine learning model that is adjusted based on the identified one or more actions; and one or more second values based at least in part on a computing cost function associated with the downstream task; and update the set of parameters of the machine learning model based at least in part on the one or more first values and the one or more second values.

9. The computer program product of claim 8, wherein the computing device is caused to:

determine whether the updated set of parameters of the machine learning model satisfies one or more performance criteria; and in response to the updated set of parameters of the machine learning model not satisfying the one or more performance criteria, perform the identifying, the using, and the updating with the updated set of parameters of the machine learning model.

10. The computer program product of claim 9, wherein the computing device is caused to:

provide the updated set of parameters of the machine learning model to one or more computing devices.

11. The computer program product of claim 8, wherein computing the one or more first values corresponding to inference loss for the machine learning model is based at least in part on a comparison between the plurality of historical outputs and outputs of the machine learning model corresponding to the plurality of test inputs.

12. The computer program product of claim 8, wherein computing the one or more second values comprises:

computing one or more distance values between a given one of the identified one or more actions and one or more of the plurality of historical actions; and identifying one or more of the plurality of historical outputs relevant to the given one of the identified one or more actions based at least in part on the computed distance values.

13. The computer program product of claim 12, wherein each of the distance values is computed based on at least one of:

an absolute difference between the given one of the identified one or more actions and a given one of the one or more of the plurality of historical actions; and a distance function for the given one of the identified one or more actions and one or more probability distributions determined for the one or more of the plurality of historical actions.

14. The computer program product of claim 8, wherein updating the set of parameters of the machine learning model comprises:

performing a stochastic gradient descent process on gradients that are computed based at least in part on the one or more first values and the one or more second values.

15. A computer-implemented method, comprising:

obtaining a machine learning model initialized with a set of parameters;

identifying one or more actions based at least in part on a plurality of test inputs corresponding to the machine learning model and a plurality of historical actions related to a downstream task, wherein the plurality of historical actions is dependent on a respective plurality of historical outputs of the machine learning model;

using the identified one or more actions to jointly compute: one or more first values corresponding to inference loss for the machine learning model that is adjusted based on the identified one or more actions; and one or more second values based at least in part on a computing cost function associated with the downstream task; and updating the set of parameters of the machine learning model based at least in part on the one or more first values and the one or more second values;

wherein the method is carried out by at least one computing device.

16. The computer-implemented method of claim 15, comprising:

determining whether the updated set of parameters of the machine learning model satisfies one or more performance criteria; and in response to the updated set of parameters of the machine learning model not satisfying the one or more performance criteria, performing the identifying, the using, and the updating with the updated set of parameters of the machine learning model.

17. The computer-implemented method of claim 16, comprising:

providing the updated set of parameters of the machine learning model to one or more computing devices.

18. The computer-implemented method of claim 15, wherein computing the one or more first values corresponding to inference loss for the machine learning model is based at least in part on a comparison between the plurality of historical outputs and outputs of the machine learning model corresponding to the plurality of test inputs.

19. The computer-implemented method of claim 15, wherein computing the one or more second values comprises:

computing one or more distance values between a given one of the identified one or more actions and one or more of the plurality of historical actions; and identifying one or more of the plurality of historical outputs relevant to the given one of the identified one or more actions based at least in part on the computed distance values.

20. The computer-implemented method of claim 15, wherein updating the set of parameters of the machine learning model comprises:

performing a stochastic gradient descent process on gradients that are computed based at least in part on the one or more first values and the more or more second values.

* * * * *